US012602420B2

(12) United States Patent
Kieser et al.

(10) Patent No.: US 12,602,420 B2
(45) **Date of Patent: \*Apr. 14, 2026**

(54) SYSTEMS AND METHODS FOR GENERATING CODES AND CODE BOOKS BASED USING COSINE PROXIMITY

(71) Applicant: Language Logic, LLC, Cincinnati, OH (US)

(72) Inventors: Frederick C. Kieser, Cincinnati, OH (US); Serge Luyens, Cincinnati, OH (US)

(73) Assignee: Language Logic, LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,768

(22) Filed: Apr. 6, 2023

(65) Prior Publication Data

US 2023/0325424 A1     Oct. 12, 2023

Related U.S. Application Data

(60) Provisional application No. 63/328,822, filed on Apr. 8, 2022.

(51) Int. Cl.
*G06F 16/35* (2025.01)
*G06F 3/0486* (2013.01)

(52) U.S. Cl.
CPC ............ *G06F 16/35* (2019.01); *G06F 3/0486* (2013.01)

(58) Field of Classification Search
CPC ........ G06F 16/35; G06F 3/0486; G06F 40/30; G06F 16/3329; G06F 16/3344;
(Continued)

(56) References Cited

U.S. PATENT DOCUMENTS 6,182,066 B1 * 1/2001 Marques ............. G06F 16/9538
707/999.005
8,554,701 B1 * 10/2013 Dillard ................... G06F 40/30
706/12
(Continued)

FOREIGN PATENT DOCUMENTS

CN           111815485 A     10/2020
CN           112015868 A     12/2020
(Continued)

OTHER PUBLICATIONS

International Search Report and Written Opinion pertaining to Application No. PCT/US2023/017815 dated Aug. 8, 2023, 10 pages.

*Primary Examiner* — Evan Aspinwall
(74) *Attorney, Agent, or Firm* — Dinsmore & Shohl LLP

(57)           ABSTRACT

Certain aspects of the disclosure provide a system and method for generating codes associated with clusters of sentiments, comprising receiving a text input, partitioning the text input into one or more segments, generating one or more numerical vectors associated with each of the one or more segments, comparing the one or more numerical vectors to generate a plurality of cosine proximity values associated with the one or more numerical vectors, applying a clustering algorithm to the one or more numerical vectors to generate clusters of segments within one or more cosine proximity ranges, and generating one or more codes associated with each of the clusters of segments within the one or more cosine proximity ranges, wherein each cluster represents an overall sentiment.

20 Claims, 12 Drawing Sheets

| ascribe ⊙ ≡ Search... | Keyw... ∨ Fitness Center: Comments | [BETA] 78% 1350/17231 |
|---|---|---|
| Codes | Coded responses | |

Sort by [Confidence ∨]  88

150 Codes

| | | |
|---|---|---|
| VERY friendly staff there  1 | › × | Locker rooms are very dirty  113 □× |
| Staff very friendly  1 | › × | Very nice staff  88 □× |
| nice people and very accommodating staff  1 | › × | Many machines are rusty  88 □× |
| The staff and management are extremely friendly and helpful  1 | › × | Nice gym  88 □× |
| Staff is friendly  1 | › × | Shower heads and knobs are missing  76 □× |
| staff was very friendly and helpful 1 | › × | I regret renewing my membership  76 □× |
| and the staff is friendly and efficient  1 | › × | My trainer  64 □× |
| very helpful and courteous staff  1 | › × | Pool dirty  60 □× |
| Very nice staff 1 | › × | The locker room  58 □× |
| very nice staff  1 | › × | Shower  56 □× |
| While the staff are nice | › × | Disgusting  54 □× |
| all staffs seem very friendly and nice  1 | › × | Repair of treadmills  49 □× |
| Staff is very good  1 | › × | Need new equipment  43 □× |
| Front desk staff have been very friendly and welcoming  1 | › × | Sauna  41 □× |
| But staff: VERY friendly  1 | › × | As a long time member  40 □× |
| the staff is courteous  1 | ›×▼ | Air conditioning  40 □×▼ |

☑ Suggested  ☑ Consider  ☐ Additional 1016     1001

1020   1022   1024

1000  1004  1008  1012 1014
1002  1006  1010

(58) Field of Classification Search

CPC .. G06F 40/295; G06F 16/3347; G06F 16/285; G06F 40/284; G06F 16/355; G06F 16/951; G06F 40/279; G06F 16/36; G06F 18/22; G06F 16/9538; G06F 16/358; G06F 16/51; G06F 18/23; G06F 16/90332; G06F 3/04842; G06F 16/55; G06F 16/2468; G06F 16/906; G06F 40/40; G06F 16/532; G06F 3/04847; G06F 3/0482; G06F 3/0481

USPC ........................................................ 707/737

See application file for complete search history.

(56) References Cited

U.S. PATENT DOCUMENTS

| | | | | |
|---|---|---|---|---|
| 10,061,767 | B1 * | 8/2018 | Mengle ................. | G06F 40/295 |
| 2010/0169317 | A1 * | 7/2010 | Wang .................... | G06Q 30/00 |
| | | | | 707/E17.046 |
| 2012/0254188 | A1 * | 10/2012 | Koperski ............. | G06F 16/353 |
| | | | | 707/E17.089 |
| 2014/0229486 | A1 * | 8/2014 | Kveton .................. | G06F 16/36 |
| | | | | 707/737 |
| 2016/0292265 | A1 * | 10/2016 | Lu .......................... | G06Q 30/02 |
| 2017/0024486 | A1 * | 1/2017 | Jacobson ............. | G06F 16/986 |
| 2018/0047071 | A1 * | 2/2018 | Hsu .................... | G06Q 30/0282 |
| 2018/0349388 | A1 * | 12/2018 | Skiles ................... | G06F 16/358 |
| 2019/0266245 | A1 * | 8/2019 | Tagra ...................... | G06F 40/30 |
| 2020/0202302 | A1 * | 6/2020 | Rathod .............. | G06F 18/2135 |
| 2020/0257761 | A1 * | 8/2020 | Bull ....................... | G06F 40/289 |
| 2020/0285662 | A1 * | 9/2020 | Chatterjee .............. | G06F 40/30 |
| 2020/0349183 | A1 * | 11/2020 | Jayaraman ............. | G06N 20/00 |
| 2021/0056129 | A1 * | 2/2021 | Huang .................. | G06F 16/358 |
| 2021/0064824 | A1 * | 3/2021 | Ranatunga ............ | H04L 51/212 |
| 2021/0350081 | A1 * | 11/2021 | De Peuter ............. | G06N 20/20 |
| 2022/0156062 | A1 * | 5/2022 | Kroth ...................... | G06F 9/541 |
| 2022/0188081 | A1 * | 6/2022 | Ni ........................... | G06F 9/453 |
| 2022/0222715 | A1 * | 7/2022 | Kazakov ............... | G06N 20/10 |
| 2022/0237368 | A1 * | 7/2022 | Tran ...................... | G06N 20/00 |
| 2023/0090924 | A1 * | 3/2023 | Mao ....................... | G06F 16/358 |
| | | | | 704/9 |
| 2023/0196023 | A1 * | 6/2023 | Tian ......................... | G06N 3/08 |
| | | | | 704/9 |

FOREIGN PATENT DOCUMENTS

| | | | |
|---|---|---|---|
| CN | 112256847 | A | 1/2021 |
| CN | 112489635 | A | 3/2021 |
| CN | 112883722 | A | 6/2021 |
| CN | 113297353 | A | 8/2021 |
| EP | 1400901 | A2 | 3/2004 |
| KR | 20210151281 | A | 12/2021 |
| WO | 2022071637 | A1 | 4/2022 |

* cited by examiner ascribe  [icons]  [Search...]  [Keyw... ˅]  Fitness AS-19124 V2: Comment  [BETA]  78%  1350/1723  [icons]  John ˅  00:03 (?)

Figure 4:
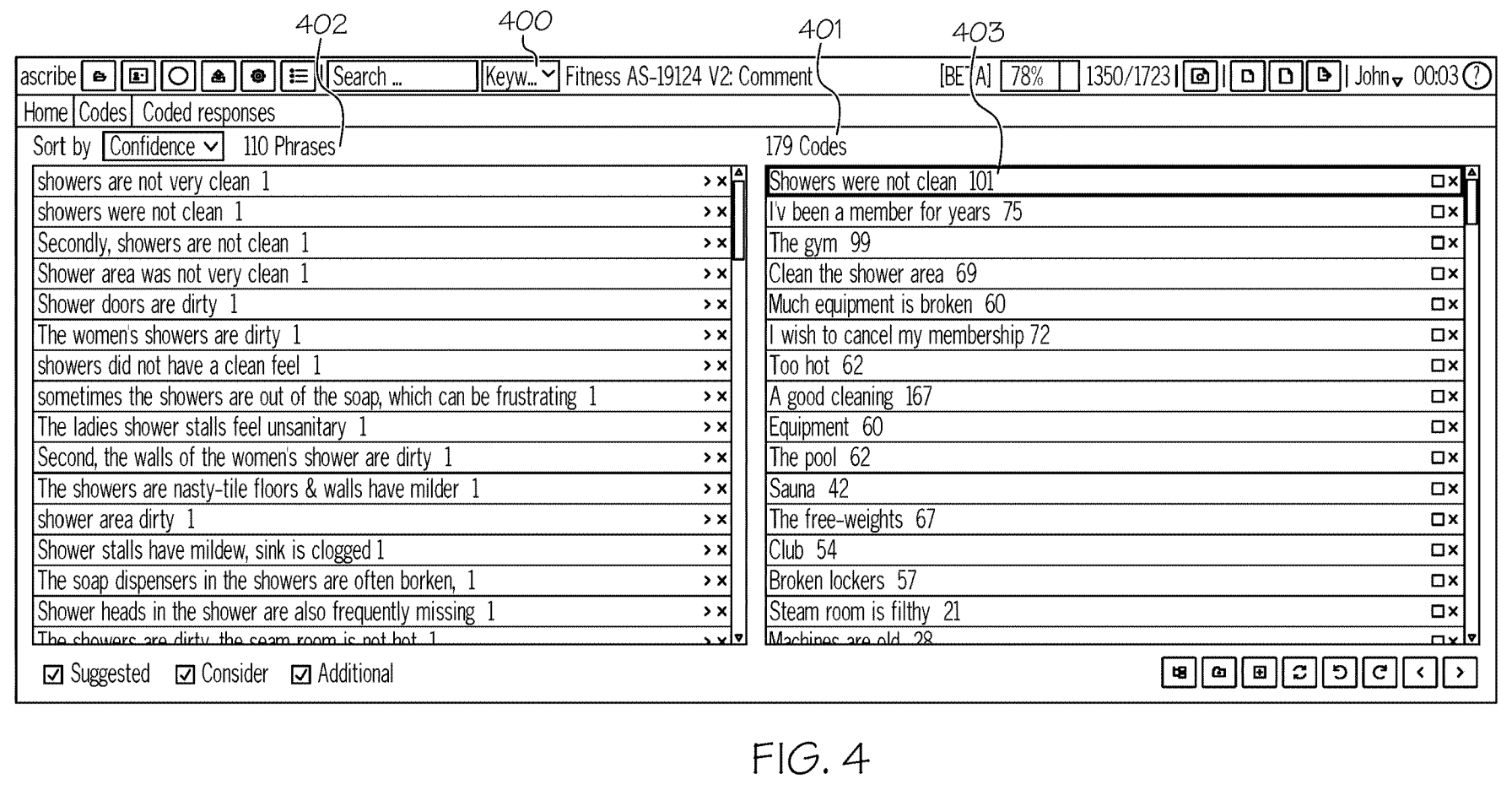

Home | Codes | Coded responses

Sort by [Confidence ˅]  110 Phrases                179 Codes

| | |
|---|---|
| showers are not very clean 1 | Showers were not clean 101 |
| showers were not clean 1 | Iv been a member for years 75 |
| Secondly, showers are not clean 1 | The gym 99 |
| Shower area was not very clean 1 | Clean the shower area 69 |
| Shower doors are dirty 1 | Much equipment is broken 60 |
| The womens showers are dirty 1 | I wish to cancel my membership 72 |
| showers did not have a clean feel 1 | Too hot 62 |
| sometimes the showers are out of the soap, which can be frustrating 1 | A good cleaning 167 |
| The ladies shower stalls feel unsanitary 1 | Equipment 60 |
| Second, the walls of the women's shower are dirty 1 | The pool 62 |
| The showers are nasty-tile floors & walls have milder 1 | Sauna 42 |
| shower area dirty 1 | The free-weights 67 |
| Shower stalls have mildew, sink is clogged 1 | Club 54 |
| The soap dispensers in the showers are often borken, 1 | Broken lockers 57 |
| Shower heads in the shower are also frequently missing 1 | Steam room is filthy 21 |
| The showers are dirty the soam room is not hot 1 | Machines are old 28 |

☑ Suggested  ☑ Consider  ☑ Additional

SYSTEMS AND METHODS FOR GENERATING CODES AND CODE BOOKS BASED USING COSINE PROXIMITY

CROSS-REFERENCE TO RELATED APPLICATIONS

This application claims the benefit of and priority to U.S. Provisional Patent Application No. 63/328,822, filed on Apr. 8, 2022, the entire contents of which are hereby incorporated by reference.

BACKGROUND

Field

The present disclosure generally relates to analyzing user text input, e.g., customer comments and customer reviews of products and services, using various language processing methods and algorithms.

Description of Related Art

Various methods exist for processing and analyzing quantities of user text input, including for example, customer comments or reviews of products and services. For example, a widely familiar form of analyzing customer reviews has been the star-rating system, wherein customers are required to assign a value between one and five stars to the service or product they received, along with a written review. In this manner, the written reviews can be categorized, sorted, and graphically represented via the number of stars users assigned (e.g., showing all one star reviews only, showing only four and five star reviews, and so forth).

Another method for analyzing user text input, e.g., customer reviews, is a database text search. A service provider's platform, e.g., website, may accept written reviews directly, which may be loaded into a database. The service provider may then search the database for a word or string of words, and the database may return all reviews that contain the searched word or word string. However, due to variations in word forms having the same meaning, or simply user spelling errors, such a search is rarely comprehensive.

Yet another method for analyzing user text input is topic modeling (sometimes referred to as probabilistic topic modeling), wherein a document or set of documents can be examined, based on the statistics of the words occurring, to model what the various topics within the document(s) may be. An example of this is Latent Dirichlet Allocation (LDA), wherein a topic is defined by a cluster of words with their respective probabilities of occurrence in the cluster. In this manner, the multiple topics may be found within a large subset of text. However, this performs poorly when a user text input is short, e.g., fifty words or less, as customer reviews and feedback often is. Even more so, advanced language processing methods and algorithms have not been applied to topic modeling.

Thus, the current methods of analyzing user text input are inefficient and rudimentary, particularly as it regards free-form user text input requiring natural language processing. There is, therefore, still an unmet need to process and analyze user text input more efficiently using advanced language processing methods and algorithms.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

The present disclosure generally relates to analyzing user text input, e.g., customer comments and customer reviews of products and services, using BERT analysis and various natural language processing (NLP) and large language model (LLM) based processes and algorithms. More particularly, the disclosed embodiments perform the steps of obtaining and analyzing a set of open-ended responses, building a codebook based on such analysis, and assigning the codes of the codebook to these responses. The analysis of the open-ended comments includes classification of verbatim comments based on threshold semantic proximities and cosine proximity thresholds. The disclosed embodiments describe a software application that integrates with and is operational on electronic devices, e.g., laptops, smartphones, etc.

One or more aspects of the subject matter described in this disclosure can be implemented in a computer-implemented method for generating codes, comprising: receiving a text input; partitioning the text input into one or more segments; generating one or more numerical vectors associated with each of the one or more segments; comparing the one or more numerical vectors to generate a plurality of cosine proximity values associated with the one or more numerical vectors; applying a clustering algorithm to the one or more numerical vectors to generate clusters of segments within one or more cosine proximity ranges; generating one or more codes associated with each of the clusters of segments within the one or more cosine proximity ranges; and displaying the one or more codes to a user on a graphical user interface One or more aspects of the subject matter described in this disclosure can be implemented in a computer-program product for grouping customer comments, comprising: instructions stored on a memory and executable by a computer processor to cause the computer-program product to: receive a text input; display a graphical user interface comprising the text input; accept a user command on the graphical user interface that causes the computer-program product to: partition the text input into one or more segments; generate one or more numerical vectors associated with each of the one or more segments; compare the one or more numerical vectors to generate a plurality of cosine proximity values associated with the one or more numerical vectors; apply a clustering algorithm to the one or more numerical vectors to generate one or more clusters of segments within one or more cosine proximity ranges, wherein: each of the one or more clusters of segments corresponds with a sentiment; generate one or more groups of customer comments associated with each of the clusters of segments within the one or more cosine proximity ranges; and display the one or more groups of customer comments to a user on the graphical user interface.

One or more aspects of the subject matter described in this disclosure can be implemented in a system for categorizing codes based on sentiment, comprising: a processor; memory coupled with the processor; instructions stored in the memory and executable by the processor to cause the system to: receive a text input; partition the text input into one or more segments; generate one or more numerical vectors associated with each of the one or more segments; compare the one or more numerical vectors to generate a plurality of cosine proximity values associated with the one or more numerical vectors; apply a clustering algorithm to the one or more numerical vectors to generate one or more clusters of segments within one or more cosine proximity ranges, wherein: each of the one or more clusters of segments corresponds with a sentiment; generate one or more codes associated with each of the clusters of segments within the one or more cosine proximity ranges; and display the one or more codes to a user on a graphical user interface.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure, and the description may admit to other equally effective aspects.

FIG. 4 depicts an example result of a user selection of a code or category within an embodiment of the software as described in the present disclosure.

FIG. 10 depicts a digital page according to one embodiment of the software application of the present disclosure having a plurality of interactive icons.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
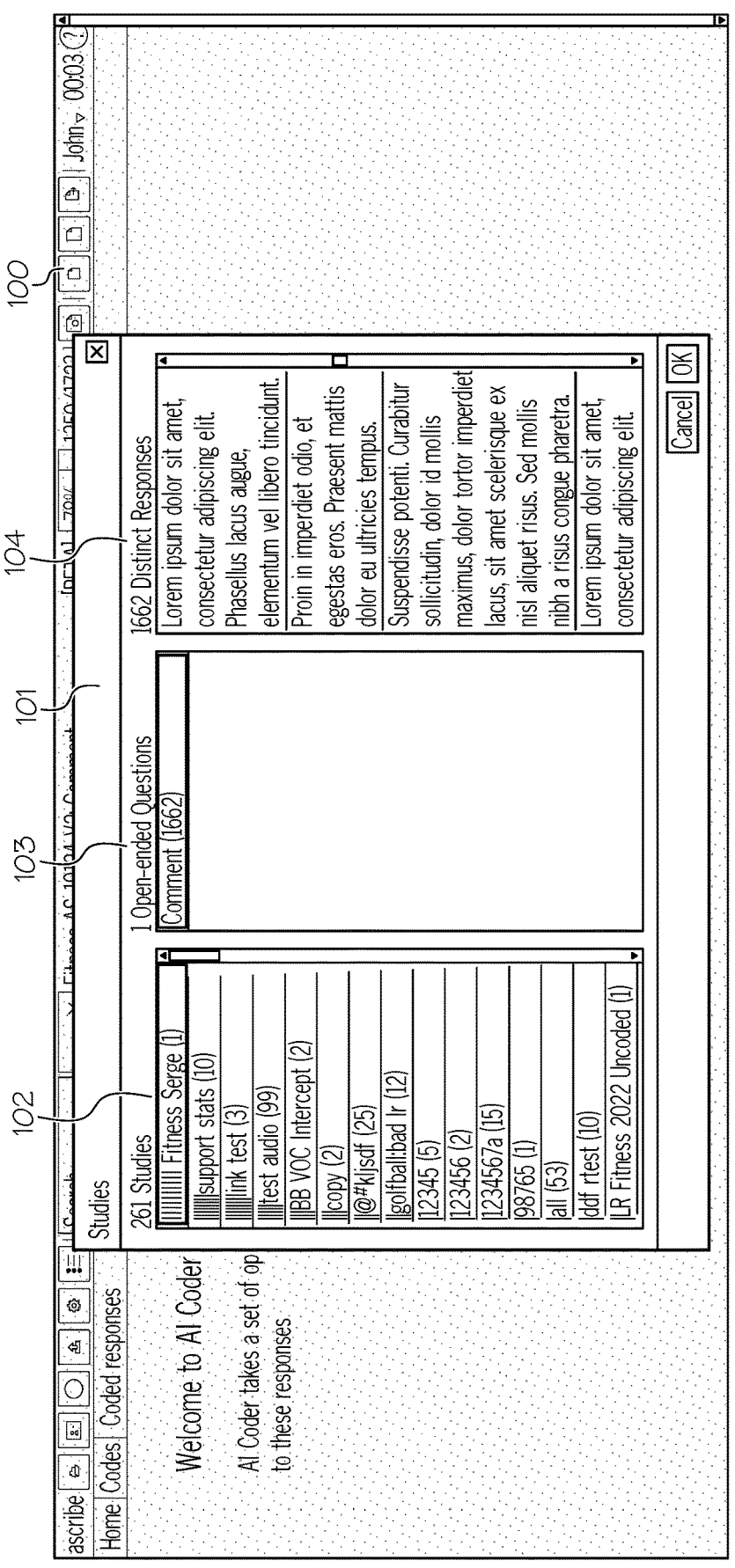
FIG. 1 depicts an example user interface of an embodiment of the software as described in the present disclosure.

Embodiments of the present disclosure are directed to systems, methods, and computer-program products that analyze open ended responses that may be included in digital content such as, e.g., without limitation, online customer reviews of various products and services, social media posts, and so forth. The embodiments described herein relate to a software application that partitions each of the sentences in the open ended responses into distinct segments or phrases based on specific markers such as, e.g., punctuation marks or segmentation based on AI. Thereafter, the software application uses BERT technology to convert these phrases into numerical vectors and implements a clustering algorithm on these numerical vectors. The implementation results in the generation of codes that are associated with these phrases. The implementation of the clustering algorithm will be described later on in this disclosure. Additionally, the embodiments described herein enable the classification of phrases into various groups based on the determination of semantic proximity between words and phrases. In particular, these phrases may be classified based on these phrases satisfying one or more distinct threshold cosine proximity values. In embodiments, a shortest phrase in each group may be identified and labeled as the heading or title of a code of category, within which these phrases may be classified.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The software application of the present disclosure may be accessible via the cloud, may be downloaded from a digital software application store accessible via a smartphone, etc. In embodiments, it is contemplated that the software application may also operate in conjunction with and within a graphical word processing environment (e.g., Microsoft Word) and/or a spreadsheet (e.g., Microsoft Excel). It is further contemplated that the software application described herein may be an add-in that is included as part of a graphical word processing environment. Alternatively, the software application may be accessible via the cloud. It is further noted that the software application as described in the present disclosure is associated with unsupervised learning and natural language processing technique. As such, pre-trained data may not be necessary and need not be utilized.

In operation, as shown in FIG. 1, an example user interface 100 of the software as described in the present disclosure is illustrated. Upon selection of an interactive icon, a list of studies 102 may be included as part of a pop-up window 101. In embodiments, these studies may include verbatim comments submitted by consumers on a variety of topics relating to various products and services. For example, one of these selected studies (e.g., a fitness study) may include comments submitted by various members that use the services of a gym. The numbers of comments may vary. In the example study illustrated in FIG. 1, 1662 distinct comments may be included and analyzed. In embodiments, the pop-up window 100 includes three distinct segments or portions. The first portion 102 lists all studies relative to various subjects, e.g., fitness, link tests, test audio, and so forth. The second portion 103 lists the different questions of the currently selected study. Finally, the third portion 104 is a verbatim recitation of the terms, phrases, and characters included in each comment in the selected question of the selected study (e.g., fitness study). It is noted these portions may be rearranged in other ways, and additional portions or sections may also be included.

Each comment in a study may range from a relatively short sentence to verbose sentences. These studies may be obtained and compiled from various sources, e.g., a survey page of a company's website, a digital page of a social media platform (e.g., Facebook, LinkedIn, etc.), and so forth. In operation, a first step of the operation of the software application as described in the present disclosure includes partitioning one or more sentences included in each comment of the study (e.g., the fitness study) into distinct ideas, or segments. Based on NLP and AI, the main ideas of each verbatim are extracted and these ideas become the underlying token for the rest of the process. Alternatively or in addition, the main ideas of each verbatim may be extracted using LLM ("large language model(s)"), which are typically capable of parsing text via more complex methods than, e.g., by analyzing punctuation marks or conjunctions alone. For example, using LLM, if a particular comment includes the sentence "I like cats, but not dogs," the main ideas extracted will be "I like cats" and "I don't like dogs." Thus, LLM provides a more elaborate and meaningful result than a split characters and split words approach, which instead would likely have generated two segments, "I like cats" and "not dogs," the latter having no meaning on its own. Therefore, using LLM can more efficiently result in a meaningful extraction of ideas, particularly in the case of freeform user input text, wherein the text does not adhere to a predefined structure or format.

Figure 2:
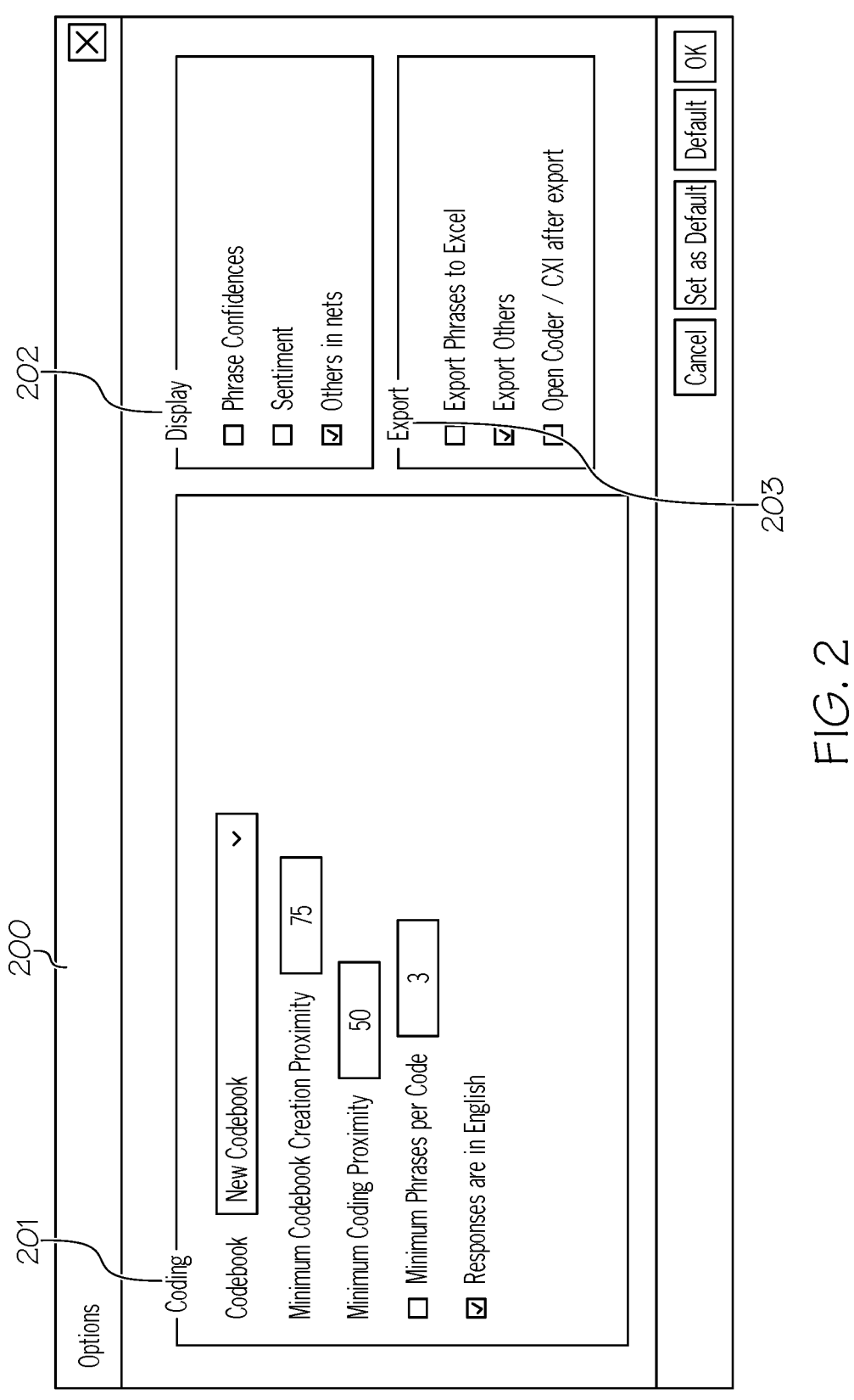
FIG. 2 depicts an options box that may be provided to a user within an embodiment of a user interface of the software as described in the present disclosure.

In embodiments, as illustrated in FIG. 2, an options box 200 may be provided to a user. The options box may include a plurality of selectable icons, text fields, checkboxes, and so forth. As illustrated, the options box may include a coding section 201, a display section 202, and an export section 203. The coding section 201 may provide users with the ability to generate a codebook based on specific criteria. In particular, the coding section 201 may include criteria that may be set and modified in order to generate a codebook. The criteria that is set and modified in the coding section 201 may form the basis for the implementation of the clustering algorithm.

The display section 202 includes a "Sentiment" section and an "Others" section. The "Others" section, when selected, will ensure that when the clustering algorithm is implemented on input data in the form of comments included in a study, e.g., the fitness study described above, a set of subcategories may be generated including a subcategory labeled "Additional," which may serve as a catch-all category for any and all phrases that may not be readily classified in a particular category. It is also noted that the software application as described in the present disclosure facilitates exporting of the results of the implementation of the clustering algorithm (e.g., the generated categories) into excel, html, etc.

After the sentences in the study are partitioned into words, phrases, and/or segments based on the criteria described above and illustrated in FIG. 2, BERT algorithms and processes may be utilized to determine numerical vectors corresponding to each of the partitioned phrases or segments. The implementation of the BERT algorithm corresponds to the second step of a process implemented by the software application of the present disclosure. As a result of the application of the BERT analysis, a distinct numerical vector may be associated with each of the respective partitioned phrases or segments. These vectors are generated based on accessing models that are built based on analyzing relationships between words across numerous sources, e.g., Wikipedia pages, public and private databases, and so forth. It is noted that these example sources are non-limiting. The generated numerical vectors may be compared with each other in order to generate a plurality of cosine proximity values. Cosine proximity values indicate a level of sematic proximity or similarity between any two phrases that are indicated in numeric form. For example, phrases like "I love cats" and "I hate dogs" may have a high level of semantic proximity, e.g., a cosine proximity value of approximately 0.98. In contrast, the phrases "I like cats" and "My tailor has a net worth of over $1,000,000" may have a cosine proximity value that is 0.0, as one phrase clearly expresses a user's sentiment towards an object (e.g., cats), while the other appears to be a factual statement about an entirely different object (e.g., tailor). Cosine proximity values may range from −1 to 1, with −1 representing a significant dissimilarity level, while 1 may represent two vectors that are identical.

A brief description of the term BERT analysis is instructive. BERT analysis is an acronym for Bidirectional Encoder Representations from Transformers ("BERT") analysis. BERT is an open source machine learning framework for natural language processing and is designed to assist devices in understanding the meaning of ambiguous language in text using surrounding text to establish context. In other words, BERT analysis utilizes an attenuation mechanism to learn contextual relationships between text. The Transformer portion of BERT analysis includes two separate and distinct mechanisms—an encoder and a decoder. The encoder may receive input in the form of text for further analysis and the decoder may generate an output in the form of a prediction based on analyzing the received text input. In contrast with directional models, which read text sequentially (e.g., from left to right), the transformer portion of BERT may analyze text bi-directionally or an entire sequence of words or phrases in a sentence simultaneously. As such, BERT analysis may enable for the determination of a context of a word based on a plurality of words or terms located to the left and the right of the word, thereby providing a more robust, comprehensive, and accurate context for various words and phrases.

In a third step of the process, the software application of the present disclosure may implement a clustering algorithm on the numerical vectors that are generated in the second step. The criteria utilized by the clustering algorithm, as illustrated in FIG. 2, may be implemented for the purpose of generating groups or clusters of phrases that may be within a threshold cosine proximity range of each other. For example, each phrase within a particular group may have a cosine proximity value that is within a predefined cosine proximity range, relative to each of the other phrases in the group. Additionally, each phrase within a particular group may have a cosine proximity value that satisfies a difference threshold relative to the phrases in another group. In other words, the phrases in a particular group may have a requisite cosine proximity value variation relative to the phrases in each of the other groups.

Figure 3:
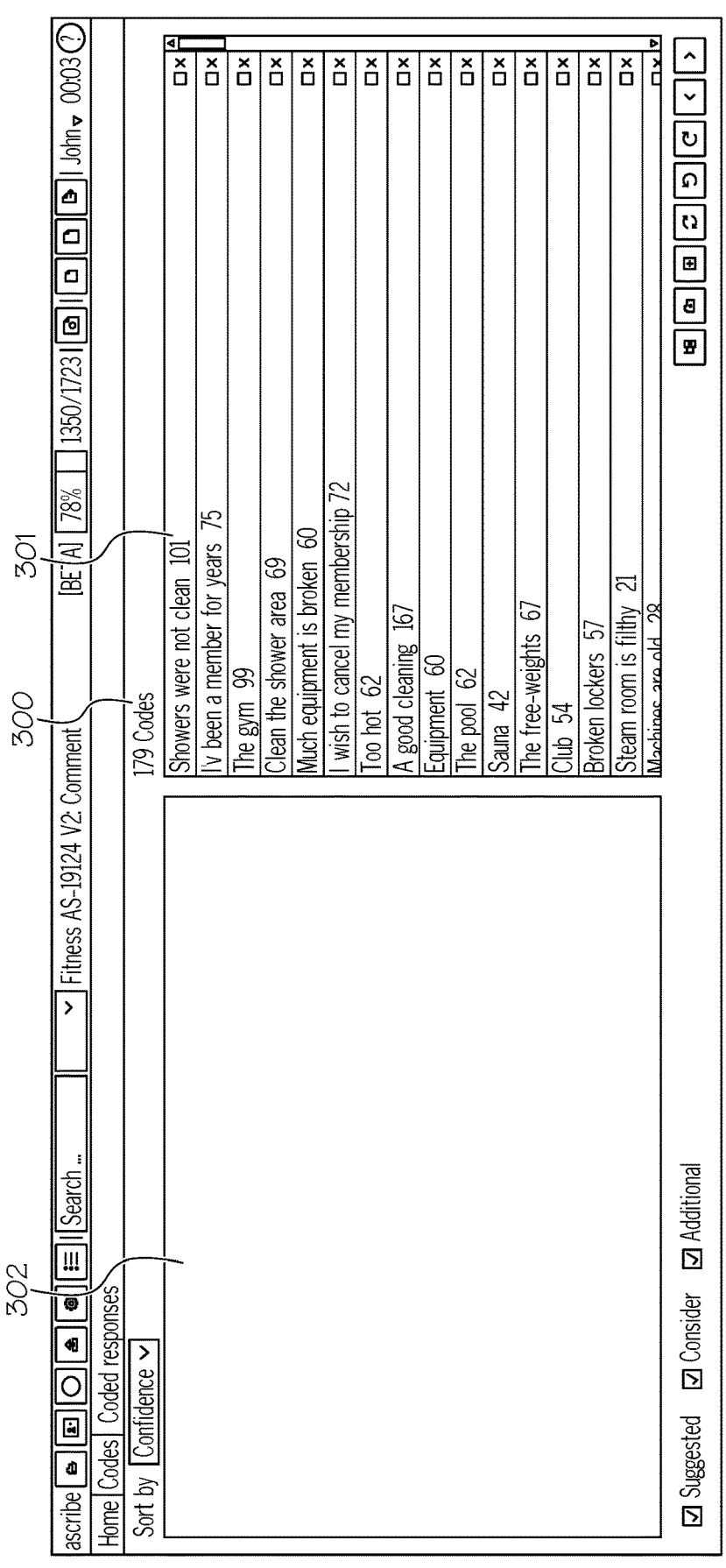
FIG. 3 depicts an example digital page of an embodiment of the software as described in the present disclosure.

FIG. 3 depicts an example digital page 300 of the software application of the present disclosure subsequent to the implementation of the clustering algorithm (in the third step) as described above. In particular, FIG. 3 depicts the categories, i.e., results 301 of the clustering algorithm that is implemented on the phrases that are identified from data (e.g., comments) included in the fitness study. Some of the categories (i.e., results) 301 that are determined based on the implementation of the clustering algorithm include, e.g., "Showers were not clean," "The gym," "Too hot," "Clean the shower area," "The pool," and so forth. Each of these categories 301 may also be referred to and labeled as, e.g., "codes." It is noted that the names of each of the codes may be deleted or modified by users. In embodiments, the example digital page illustrated above may include two sections. The right section or portion 301 may list all of the codes (i.e., categories, or results), and the left section 302 may include or list each phrase that is included with the specific code or category. In the right section 301, adjacent to each code, a number may be listed, which indicates the number of all of the phrases that are grouped or classified under that specific code. For example, the codes or categories of "Showers were not clean," "Too hot," and "The pool" include 101, 62, and 99 phrases, respectively. Upon selection of the codes, these phrases may be displayed on the left portion 302 of the digital page.

FIG. 4 illustrates an example result of a user selection of a code or category 403 labeled "Showers were not clean," within the codes or categories section 401. As illustrated, all of the phrases included within this category 403 are depicted on the left portion 402 of the digital page 400. In this example, 110 phrases are included within the category 403 of "Showers were not clean." Each of these phrases are listed on the left portion 402 of the digital page 400 in descending order of confidence, with the phrase having the highest confidence level being listed near the top of the page. It is noted that the 110 phrases may be classified into three distinct subcategories—"Suggested," "Consider," and "Additional."

Figure 5A:
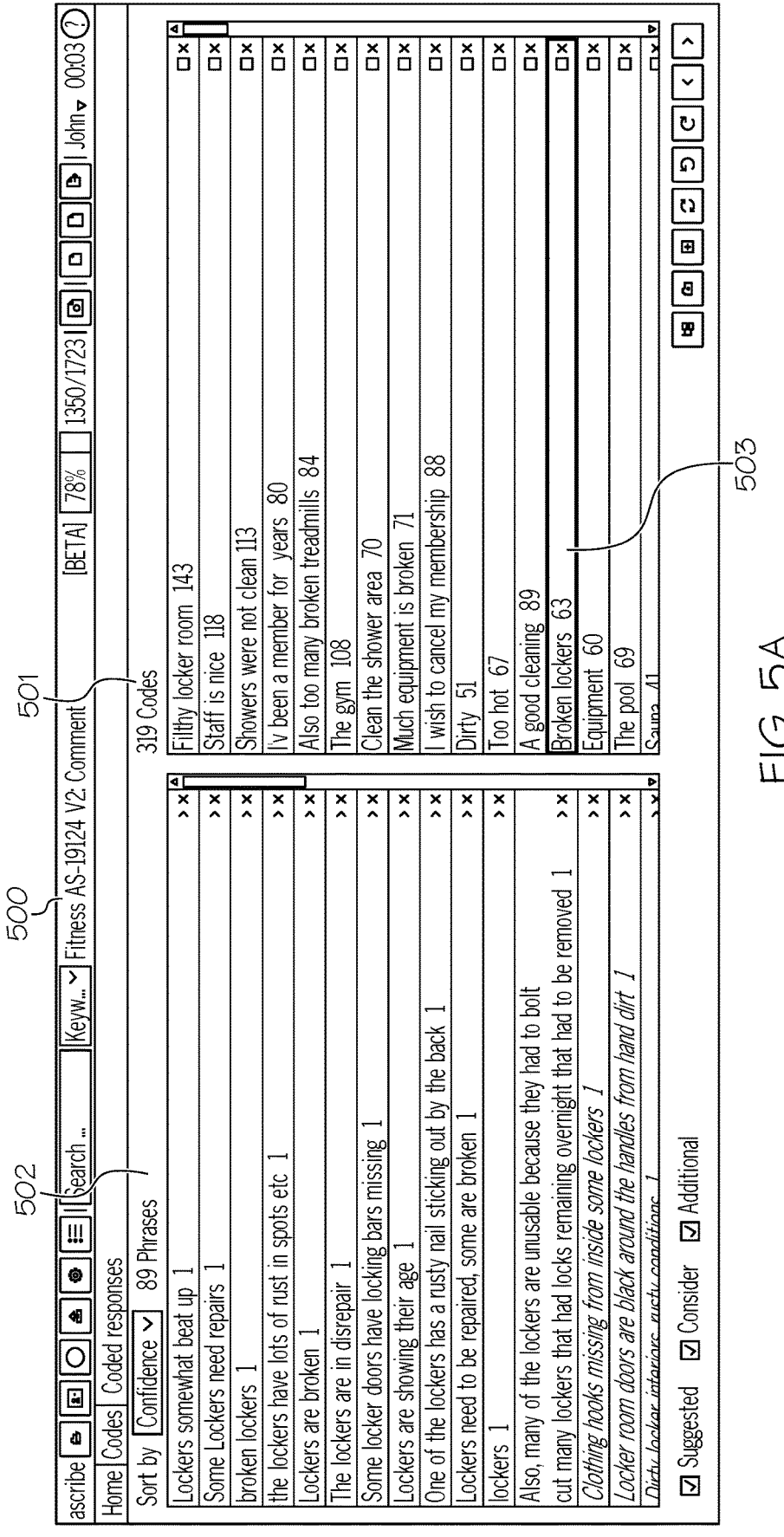
FIG. 5A depicts phrases included under examples of subcategories of an embodiment of the software as described in the present disclosure.
Figure 5B:
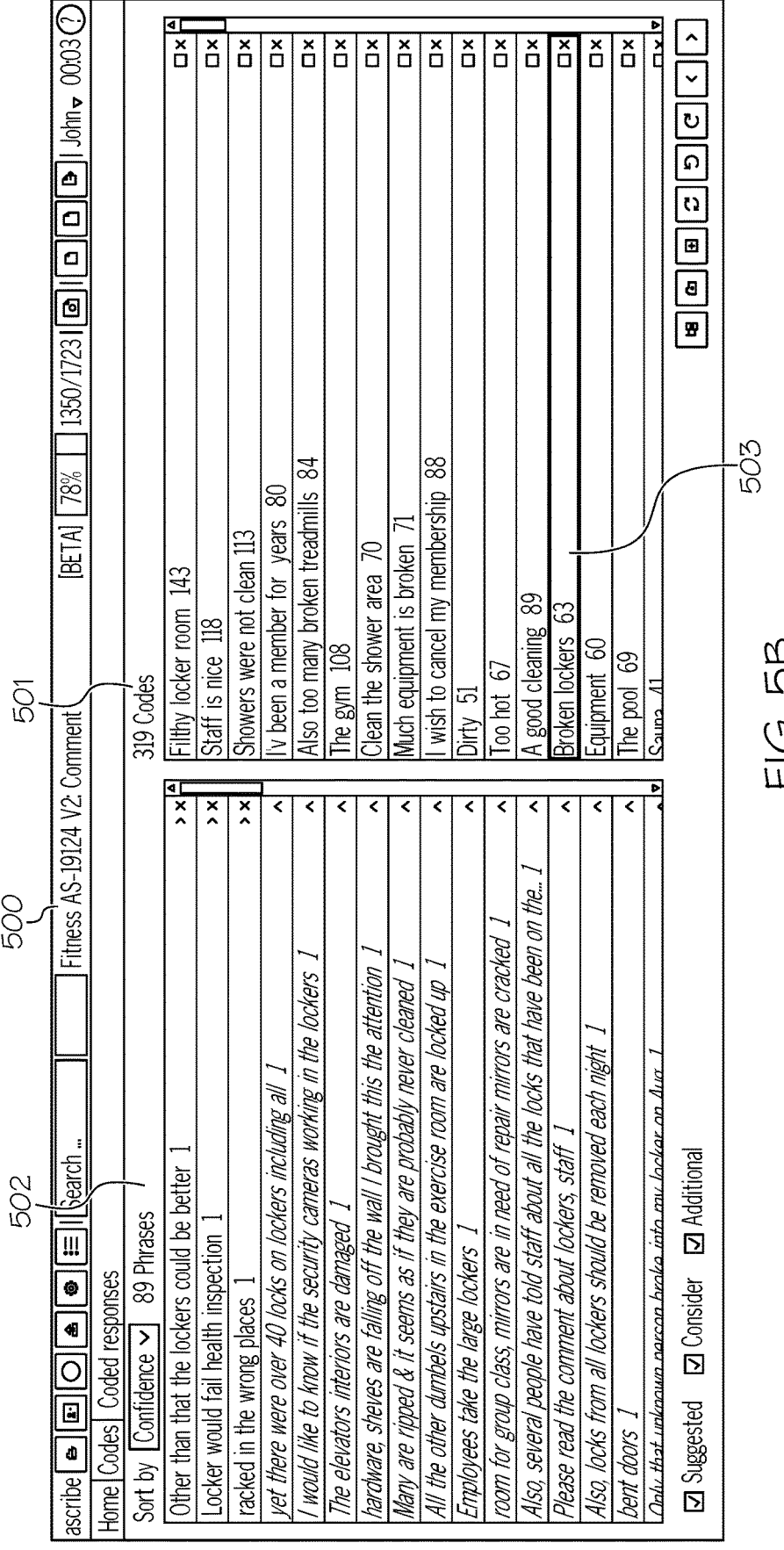
FIG. 5B depicts phrases included under examples of subcategories of an embodiment of the software as described in the present disclosure.

FIGS. 5A and 5B depict phrases included under each of the subcategories of Suggested, Consider, and Additional. Upon user selection of the code or category labeled "Broken Lockers," 89 phrases may be populated and a subset of these phrases may be displayed in bold, while other subsets may be illustrated in non-bolded text, while yet other subsets of phrases may be displayed in Italics. For example, the phrases displayed in bold such as, e.g., "Lockers somewhat beat up," "broken lockers," "The lockers are in disrepair," are those that satisfy a particular threshold cosine proximity value that is included in the coding section illustrated in FIG. 2, e.g., 75%. In contrast, the phrases included in the subcategory of "consider" are those that fail to satisfy the threshold cosine proximity value of 75%, but still have a cosine proximity value that is at or above 50%, as indicated in the coding section of FIG. 2. Finally, as illustrated in FIG. 5B, a set of phrases may be displayed in Italics and may correspond to phrases that fail to satisfy the cosine proximity value of 50%.

Figure 6:
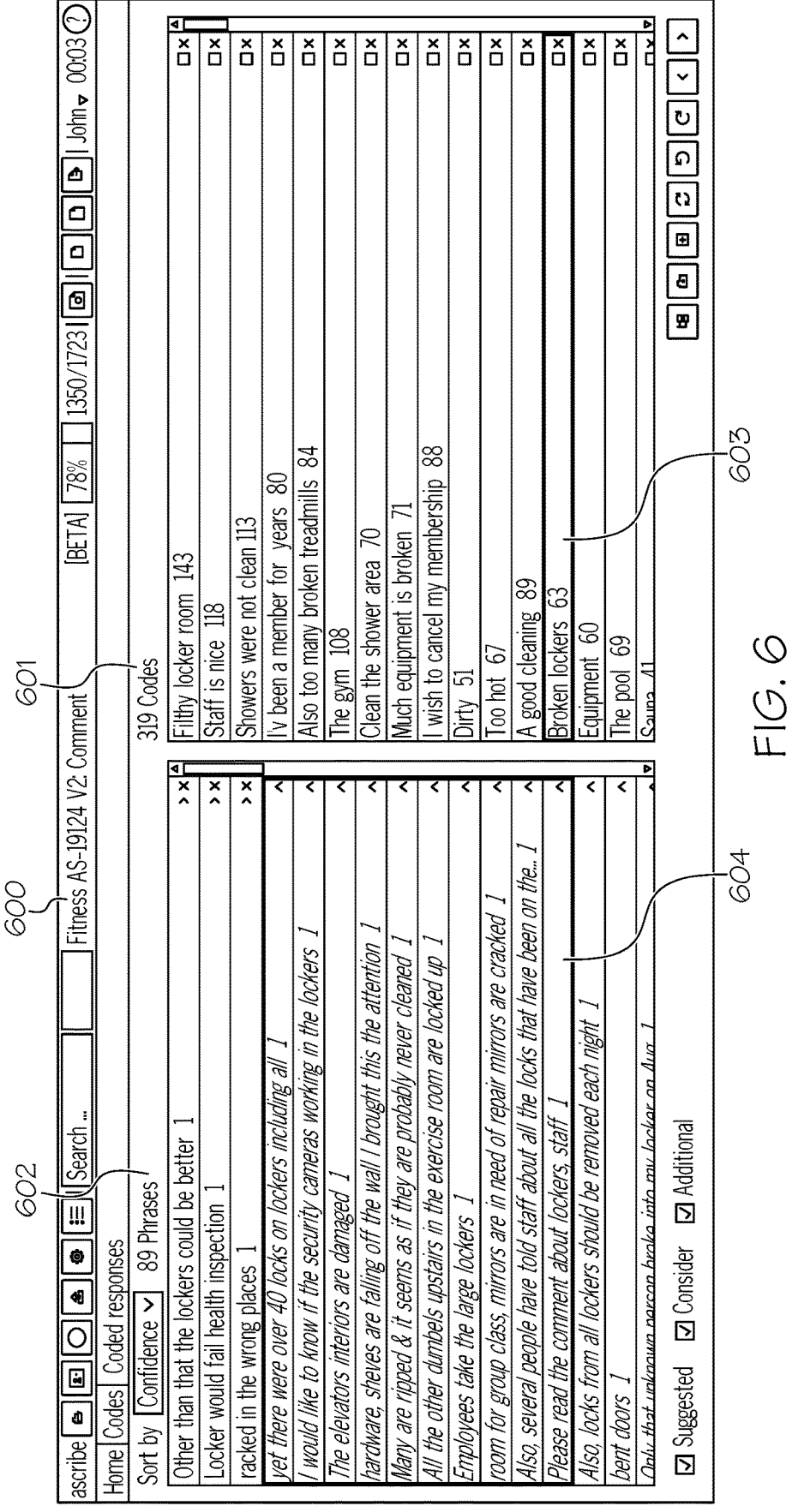
FIG. 6 depicts an example user interaction within an embodiment of the software as described in the present disclosure, in which a user may move a number of phrases into a particular subcategory

FIG. 6 depicts an example user interaction in which a user may move a large number of phrases 604 at the discretion of the user into a particular subcategory 603. For example, as illustrated in FIG. 6, a number of phrases 604 are displayed as being highlighted or selected. These phrases may be highlighted by a user and transferred from the subcategory of "Additional" to another subcategory, e.g., either "Suggested" or "Consider," in a single interaction (e.g., selection of an interactive icon, drag and drop operation, and so forth).

Figure 7:
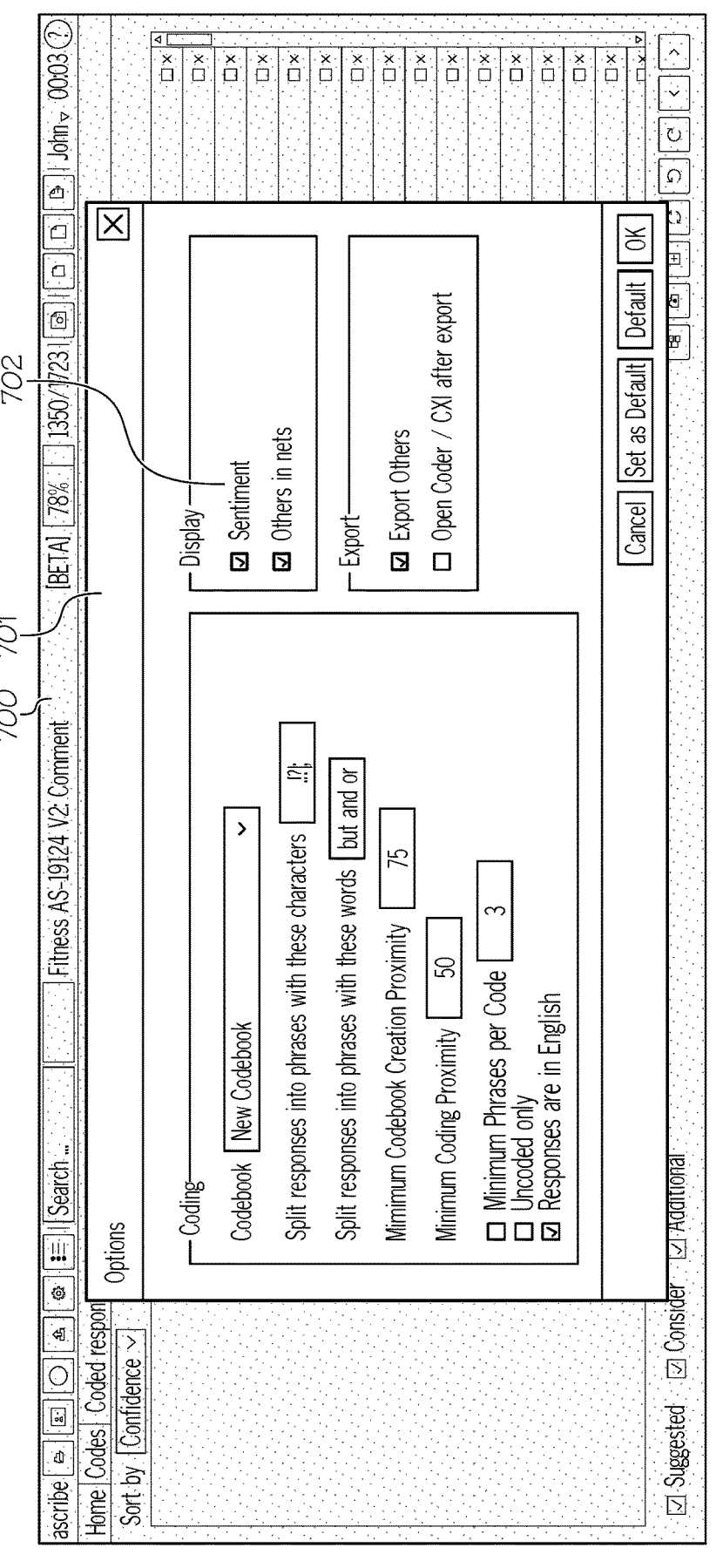
FIG. 7 depicts an example implementation of the software application of the present disclosure in which each of the phrases in a particular study may be grouped within various sentiment categories.

FIG. 7 depicts an example implementation of the software application of the present disclosure in which each of the phrases in a particular study may be grouped within various sentiment categories. For example, phrases may be grouped into the sentiment categories of, e.g., positive, negative, and neutral.

Figure 8:
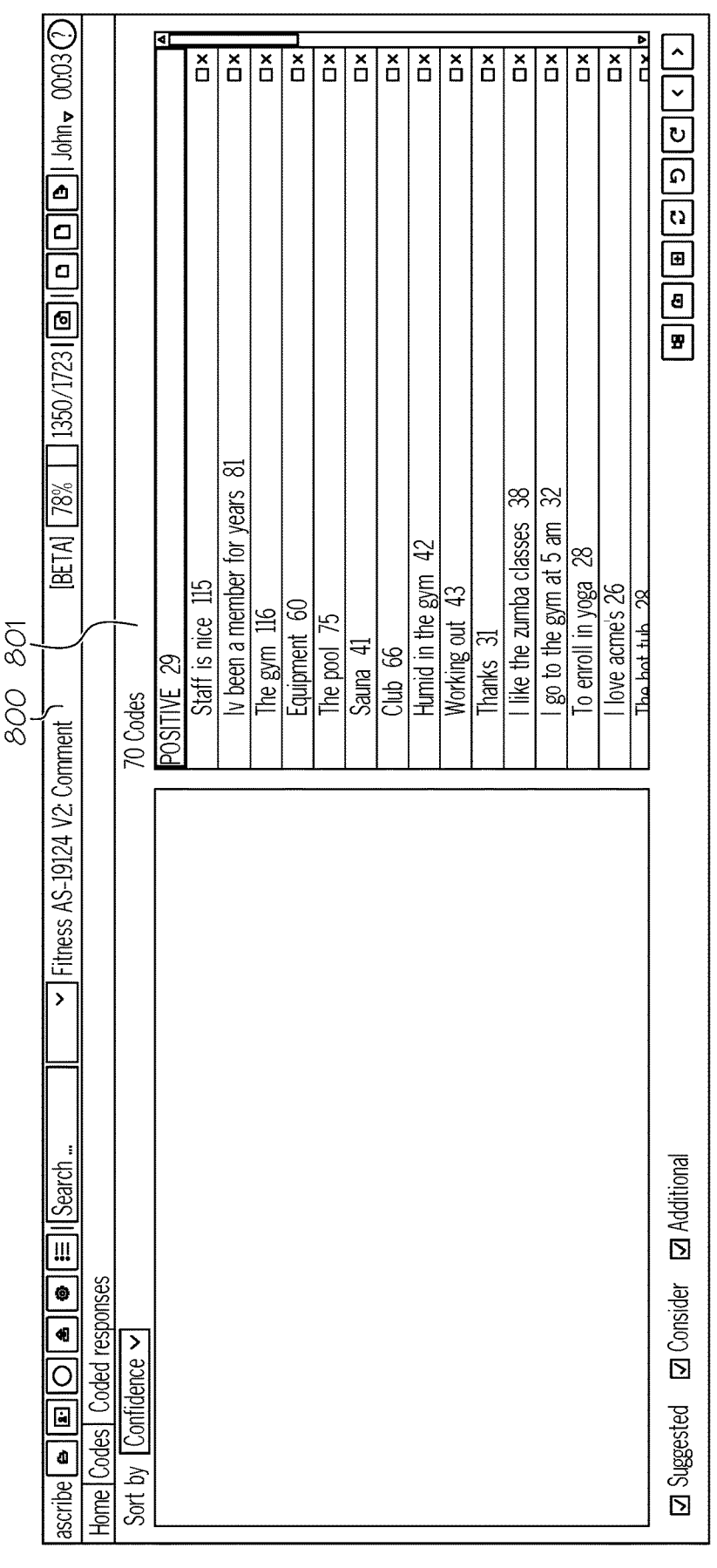
FIG. 8 depicts a variety of codes that may be classified in a particular sentiment category according to an embodiment of the software as described in the present disclosure.

FIG. 8 depicts a variety of codes 802 that are classified in the "positive" sentiment category. In particular, upon selection of the "Sentiment" checkbox 702 in the display category as shown in FIG. 7, the software application of the present disclosure may implement the clustering algorithm, as described above, generate codes, and classify these codes into one of the sentiment categories of positive, neutral, negative, or other. FIG. 8 merely lists the codes 801 in the positive category. In particular, FIG. 8 lists the categories of "Staff is nice," "The gym," "The pool," "Sauna," and so forth, all of which are classified under the positive sentiment category.

Figure 9:
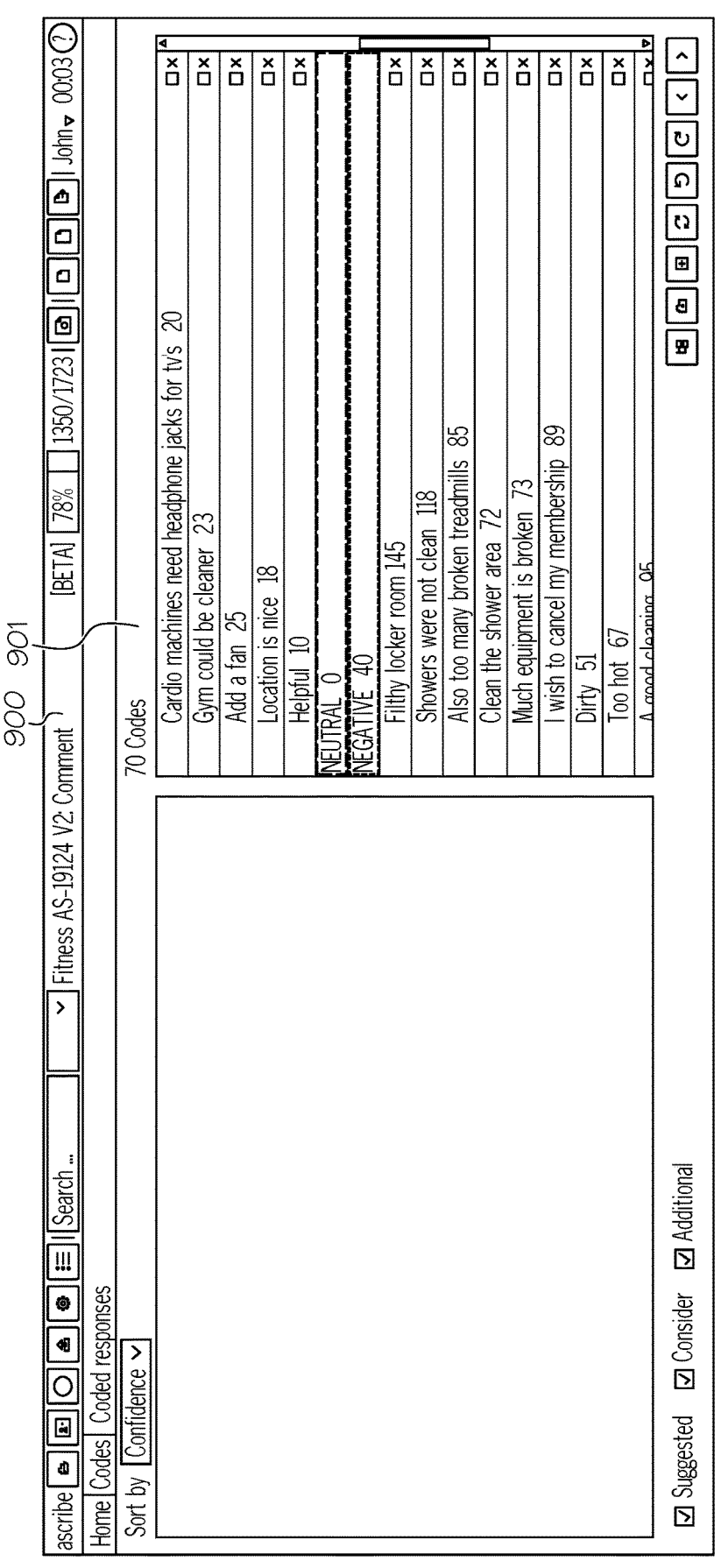
FIG. 9 depicts a number of codes or categories that may be classified in a particular sentiment category according to an embodiment of the software as described in the present disclosure.

FIG. 9 depicts a number of codes or categories 901 that are classified in the "negative" sentiment category. In particular, words and phrases within each of these categories includes primarily unflattering and critical comments regarding the services that may be provided by the gym. Some of the code words classified in the "negative" sentiment category may include "Filthy locker room," "Showers were not clean," "Dirty bathrooms," and so forth.

In order to accurately categorize the phrases of a category or code, and by extension, the code, into a particular sentiment category, the software application of the present disclosure utilizes a pre-trained machine learning model, into which each of the partitioned phrases, words, or segments may be inputs. Thereafter, upon receipt of these inputs, the pre-trained machine learning model may determine a cosine proximity value of each of the phrases in a category or code with the sentiment category of positive, negative, neutral, or other. In embodiments, the software application may select or extract the top ten phrases from each code or category, convert these phrases into numeric vectors, and input this data into a pre-trained machine learning model that determines cosine proximities of each of these phrases relative to each of the multiple sentiment categories, e.g., positive, negative, or neutral. In this way, the model enables the software application to accurately classify each phrase within a particular sentiment category.

Figure 10:
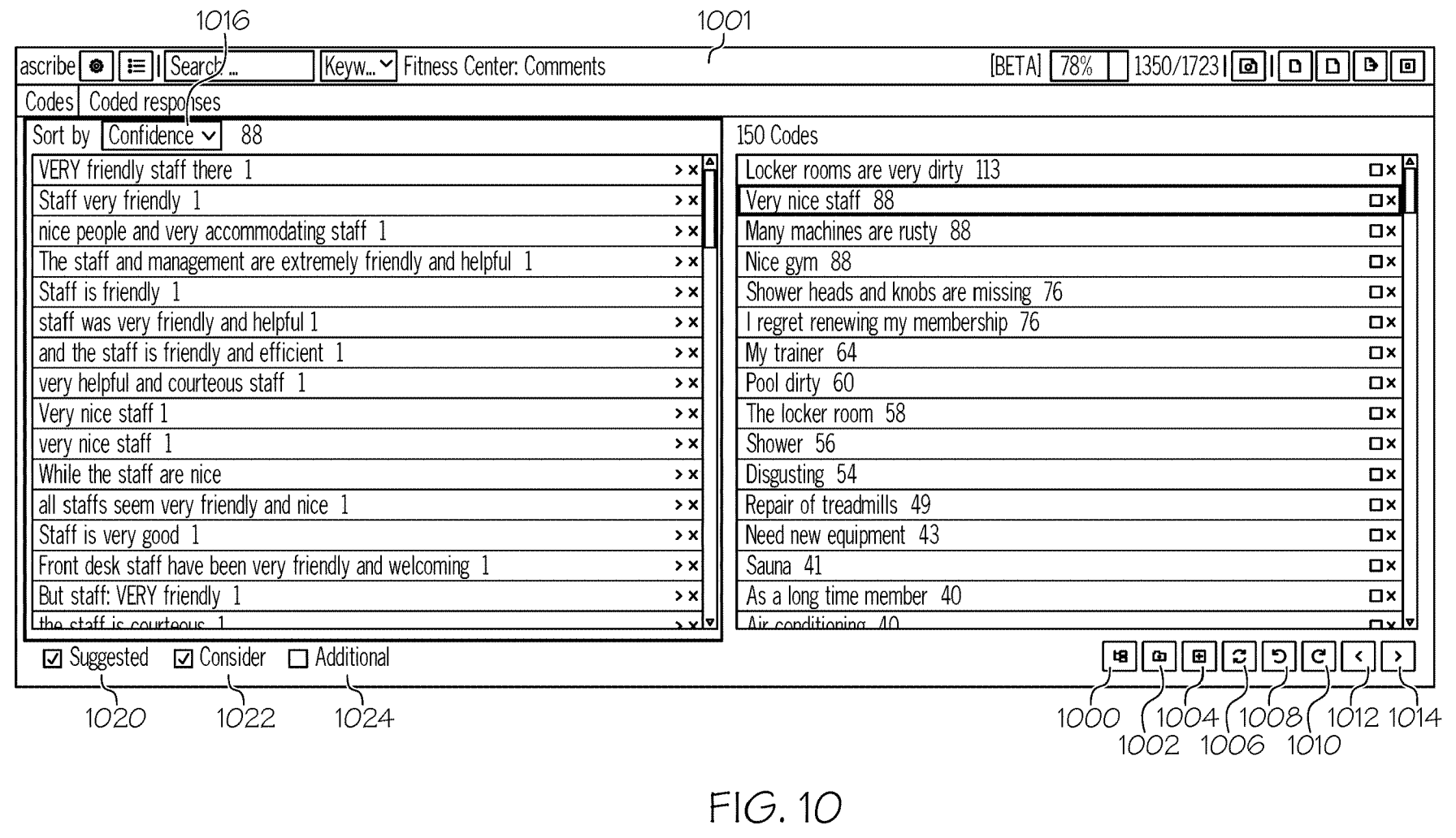

FIG. 10 illustrates a digital page 1001 of the software application of the present disclosure with a plurality of interactive icons, according to one or more embodiments described and illustrated herein. The interactive icons include an icon that is an artificial intelligence tool that, when selected, initiates the implementation of the clustering algorithm to identify codes or categories, as illustrated in the figures and particularly in FIG. 10. Example interactive icon 1002 enables a user to select codes and reassign the selected codes into different groups.

A user may also use the example interactive icon 1002 to perform a drag and drop operation on one or more codes or categories and/or phrases included within each of the codes or categories. Example interactive icon 1004 is associated with a feature that enables a user to add a code manually to the current list of codes. Example interactive icons 1006, 1008, and 1010 are associated with a refresh operation, an undo operation, and a redo operation, respectively. In addition, the example interactive icons 1012 and 1014 are associated with artificial intelligence based processes. In particular, selecting the example interactive icon 1012 may result in the generation of a fewer number of codes relative to the codes that are currently listed and the selection of the example interactive code 1014 will result in the generation of an additional number of codes relative to the codes that may be generated and available at a given time.

In embodiments, the example interactive icon 1016 is a drop down menu that may enable a user to sort the phrases included within a particular code or category (displayed on the right portion of the digital page, as illustrated in FIG. 10) based on various criteria, e.g., confidence. As illustrated in FIG. 10, all of the phrases included in the code or category of "very nice staff" are sorted by the criteria of confidence. Example interactive checkboxes 1020, 1022, and 1024 are associated with the subcategories of "Suggested," "Consider," and "Additional." The phrases that are bolded are associated with the "Suggested" subcategory, which are assigned or associated with a high confidence level. In contrast, the phrases that are not bolded (i.e., displayed in regular font) are associated with the "Consider" subcategory, and were classified within the "Consider" category during a consolidation phase of the clustering algorithm. In embodiments, the phrases in the "Consider" subcategory may satisfy a cosine proximity threshold that is above, e.g., 50%, but may not satisfy the cosine proximity threshold of 75%. Additionally, in embodiments, the phrases that are categorized in the "Additional" subcategory may fail to have cosine proximity values that satisfy either the 50% or the 75% cosine proximity threshold values. However, these phrases may still have cosine proximity values that are within a threshold level of 50%. As such, these phrases may be somewhat relevant to a particular category or code, and may be manually transferred into either one of the "Consider" or "Suggested" subcategories.

Figure 11:
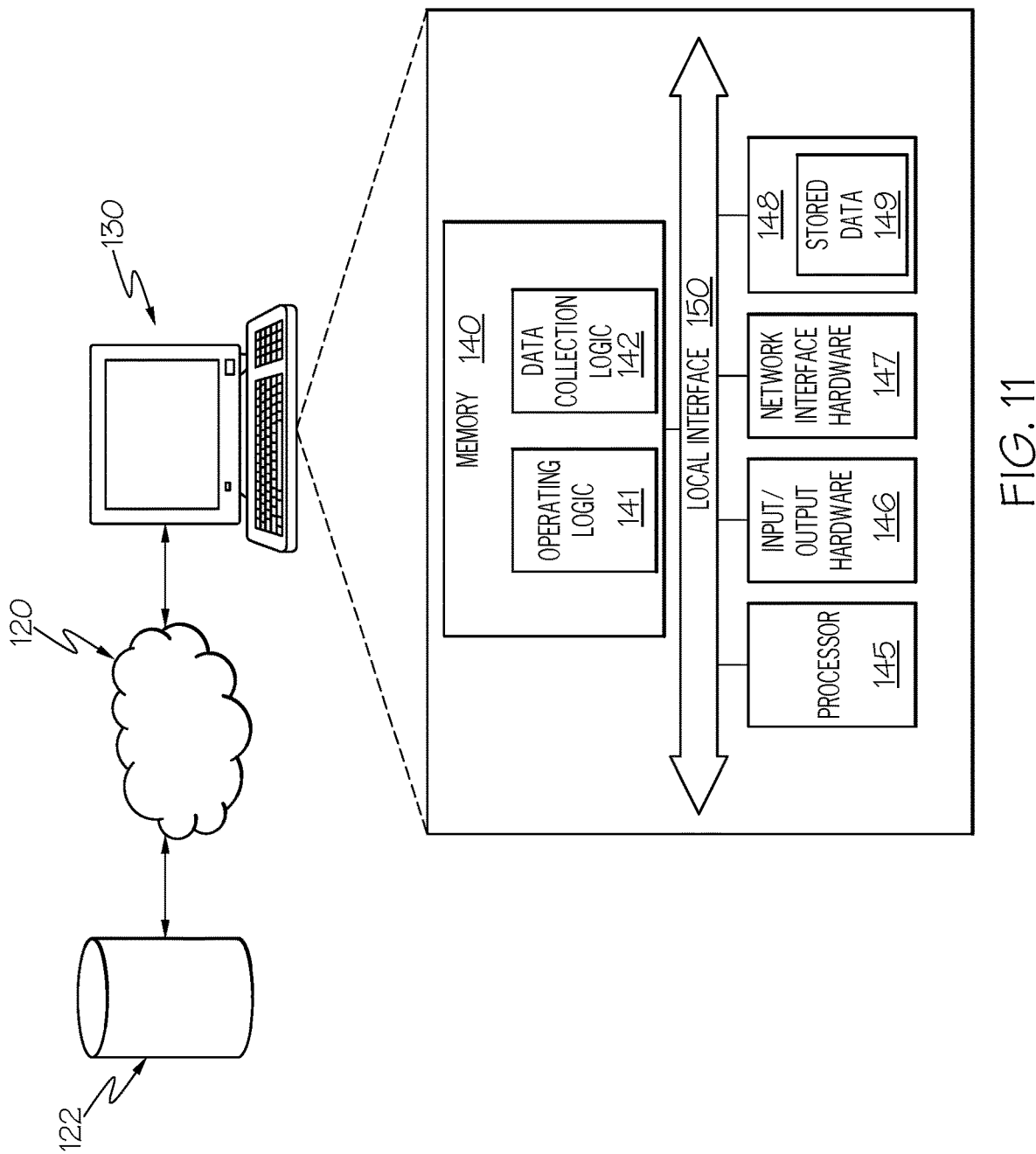
FIG. 11 depicts an example system architecture according to one embodiment of the present disclosure.

FIG. 11 illustrates an example system according to one embodiment of the present disclosure, and exemplary components therein. Embodiments of the present disclosure may be implemented by a computing device, and may be embodied as computer-readable instructions stored on a non-transitory memory device. The example computing device 130 provides a system for performing the software application operations, accepting input and command-line instructions from a user via a graphical user interface, and displaying output to the user via the graphical user interface, as well as a non-transitory computer usable medium having computer readable program code for the same, embodied as hardware, software, and/or firmware, according to embodiments shown and described herein. While in some embodiments, the computing device 130 may be configured as a general purpose computer with the requisite hardware, software, and/or firmware, in some embodiments, the computing device 130 may be configured as a special purpose computer or mobile or handheld device designed specifically for performing the functionality described herein. It should be understood that the software, hardware, and/or firmware components depicted in FIG. 11 may also be provided in other computing devices external to the computing device 130 (e.g., data storage devices, remote server computing devices, and the like).

As also illustrated in FIG. 11, the computing device 130 (or other additional computing devices) may include a processor 145, input/output hardware 146, network interface hardware 147, a data storage component 148 for maintaining stored data 149A, and a non-transitory memory component 140. The memory component 140 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components.

Additionally, the memory component 140 may be configured to store operating logic 141 and data collecting logic 142 for collecting data as described herein (each of which may be embodied as computer readable program code, firmware, or hardware, as an example). It should be understood that the data storage component 148 may reside local to and/or remote from the computing device 130, and may be configured to store one or more pieces of data for access by the computing device 130 and/or other components.

A local interface 150 is also included in FIG. 11 and may be implemented as a bus or other interface to facilitate communication among the components of the computing device 130.

The processor 145 may include any processing component configured to receive and execute computer readable code instructions (such as from the data storage component 148 and/or memory component 140). The input/output hardware 146 may include input devices such as a keyboard and mouse, graphics display device, printer, camera, microphone, speaker, touch-screen, and/or other device for receiving, sending, and/or presenting data. The network interface hardware 147 may include any wired or wireless networking hardware, such as a modem, LAN port, wireless fidelity (Wi-Fi) card, WiMax card, mobile communications hardware, and/or other hardware for communicating with other networks and/or devices. The network interface hardware 147 may communicate via the Internet to receive external data 122 provided from one or more sources.

Included in the memory component 140 may be the operating logic 141 and data collection logic 142. The operating logic 141 may include an operating system and/or other software for managing components of the computing device 130. The operating logic 141 may also include computer readable program code for displaying the graphical user interface used by the user to interact with the system and perform the operations described herein. Similarly, the data collection logic 142 may reside in the memory component 140 and may be configured to receive and store data 122 from one or more sources of external data.

The components illustrated in FIG. 11 are merely exemplary and are not intended to limit the scope of this disclosure. More specifically, while the components in FIG. 11 are illustrated as residing within the computing device 130, this is a non-limiting example. In some embodiments, one or more of the components may reside external to the computing device 130.

Example Clauses

Clause 1. A computer-implemented method for generating codes, comprising: receiving a text input; partitioning the text input into one or more segments; generating one or more numerical vectors associated with each of the one or more segments; comparing the one or more numerical vectors to generate a plurality of cosine proximity values associated with the one or more numerical vectors; applying a clustering algorithm to the one or more numerical vectors to generate clusters of segments within one or more cosine proximity ranges; generating one or more codes associated with each of the clusters of segments within the one or more cosine proximity ranges; and displaying the one or more codes to a user on a graphical user interface.

Clause 2. The method of clause 1, wherein the cosine proximity values indicate a level of semantic proximity between segments.

Clause 3. The method of clause 1, wherein the text input is comprised of customer comments.

Clause 4. The method of clause 1, wherein each of the one or more segments comprises a distinct idea.

Clause 5. The method of clause 1, wherein partitioning the text input uses NLP.

Clause 6. The method of clause 1, wherein partitioning the text input uses AI.

Clause 7. The method of clause 1, wherein partitioning the text input uses LLM.

Clause 8. The method of clause 1, wherein the one or more numerical vectors are generated using a BERT algorithm.

Clause 9. The method of clause 1, wherein the clustering algorithm is based on criteria selected by the user using the graphical user interface.

Clause 10. The method of clause 1, wherein the user can perform drag and drop operations on the one or more codes using the graphical user interface.

Clause 11. A computer-program product for grouping customer comments, comprising: instructions stored on a memory and executable by a computer processor to cause the computer-program product to: receive a text input; display a graphical user interface comprising the text input; accept a user command on the graphical user interface that causes the computer-program product to: partition the text input into one or more segments; generate one or more numerical vectors associated with each of the one or more segments; compare the one or more numerical vectors to generate a plurality of cosine proximity values associated with the one or more numerical vectors; apply a clustering algorithm to the one or more numerical vectors to generate one or more clusters of segments within one or more cosine proximity ranges, wherein: each of the one or more clusters of segments corresponds with a sentiment; generate one or more groups of customer comments associated with each of the clusters of segments within the one or more cosine proximity ranges; and display the one or more groups of customer comments to a user on the graphical user interface.

Clause 12. The computer-program product of clause 11, wherein the graphical user interface comprises a coding section, a display section, and an export section.

Clause 13. The computer-program product of clause 12, wherein the coding section comprises criteria determined by the user using the graphical user interface.

Clause 14. The computer-program product of clause 13, wherein the criteria generates a codebook that forms a basis for implementation of a clustering algorithm.

Clause 15. The computer-program product of clause 11, wherein the user can perform drag and drop operations on the one or more groups of customer comments using the graphical user interface.

Clause 16. A system for categorizing codes based on sentiment, comprising: a processor; memory coupled with the processor; instructions stored in the memory and executable by the processor to cause the system to: receive a text input; partition the text input into one or more segments; generate one or more numerical vectors associated with each of the one or more segments; compare the one or more numerical vectors to generate a plurality of cosine proximity values associated with the one or more numerical vectors; apply a clustering algorithm to the one or more numerical vectors to generate one or more clusters of segments within one or more cosine proximity ranges, wherein: each of the one or more clusters of segments corresponds with a sentiment; generate one or more codes associated with each of the clusters of segments within the one or more cosine proximity ranges; and display the one or more codes to a user on a graphical user interface.

Clause 17. The system of clause 16, wherein the cosine proximity values indicate a level of semantic proximity between segments.

Clause 18. The system of clause 16, wherein partitioning the text input uses NLP, AI, or LLM.

Clause 19. The system of clause 16, wherein the one or more numerical vectors are generated using a BERT algorithm.

Clause 20. The system of clause 16, wherein the user can perform drag and drop operations on the one or more codes using the graphical user interface.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for generating codes, comprising:

receiving a text input comprising a plurality of customer reviews of consumer products and services;

partitioning the text input into one or more segments, each segment associated with a semantic meaning;

generating one or more numerical vectors associated with each of the one or more segments, wherein each numerical vector represents a relationship between the associated segments and the one or more segments;

comparing the one or more numerical vectors to generate, using a pre-trained machine learning model, a plurality of cosine proximity values associated with the one or more numerical vectors, wherein the machine learning model is pre-trained based on previous customer reviews and review sentiments;

applying a clustering algorithm to the one or more numerical vectors to generate clusters of segments within one or more cosine proximity ranges;

generating, using the pre-trained machine learning model, one or more codes associated with each of the clusters of segments within the one or more cosine proximity ranges, wherein each code is a category related to one or more of the customer reviews;

displaying the one or more codes to a user on a graphical user interface;

determining a confidence level for each of the one or more of the customer reviews of a selected code based on the plurality of cosine proximity values associated with the segments in the one or more of the customer reviews; and displaying the one or more of the customer reviews associated with the selected code in sorted order according to the confidence levels of the one or more of the customer reviews.

2. The method of claim 1, wherein the cosine proximity values indicate a level of semantic proximity between segments.

3. The method of claim 1, wherein each of the one or more segments comprises a distinct semantic meaning.

4. The method of claim 1, wherein partitioning the text input uses Natural Language Processing.

5. The method of claim 1, wherein partitioning the text input uses Artificial Intelligence.

6. The method of claim 1, wherein partitioning the text input uses a Large Language Model.

7. The method of claim 1, wherein the one or more numerical vectors are generated using a Bidirectional Encoder Representations from Transformers algorithm comprising a machine-learning framework.

8. The method of claim 1, wherein the clustering algorithm is based on criteria selected by the user using the graphical user interface.

9. The method of claim 1, wherein the user can perform drag and drop operations on the one or more codes using the graphical user interface.

10. A non-transitory computer-program product for grouping customer comments, comprising:

instructions stored on a memory and executable by a computer processor to cause the computer-program product to:

receive a text input comprising a plurality of customer comments and customer reviews of consumer products and services;

display a graphical user interface comprising the text input;

accept a user command on the graphical user interface that causes the computer-program product to:

partition the text input into one or more segments, each segment associated with a semantic meaning;

generate one or more numerical vectors associated with each of the one or more segments, wherein each numerical vector represents a relationship between the associated segments and the one or more segments;

compare the one or more numerical vectors to generate, using a pre-trained machine learning model, a plurality of cosine proximity values associated with the one or more numerical vectors, wherein the machine learning model is pre-trained based on previous customer reviews and review sentiments;

apply a clustering algorithm to the one or more numerical vectors to generate one or more clusters of segments within one or more cosine proximity ranges, wherein each of the one or more clusters of segments corresponds with a sentiment;

generate, using the pre-trained machine learning model, one or more groups of customer comments associated with each of the clusters of segments within the one or more cosine proximity ranges, wherein each group is a sentiment category related to one or more of the customer comments and customer reviews, and the sentiment category comprises positive, negative, neutral, or a combination thereof;

display the one or more groups of customer comments to a user on the graphical user interface;

determine a confidence level for each of the one or more of customer reviews of a selected group based on the plurality of cosine proximity values associated with the segments in the one or more of customer reviews; and display the one or more of the customer reviews associated with the selected group in sorted order according to the confidence levels of the one or more reviews.

11. The non-transitory computer-program product of claim 10, wherein the graphical user interface comprises a coding section, a display section, and an export section.

12. The non-transitory computer-program product of claim 11, wherein the coding section comprises criteria determined by the user using the graphical user interface.

13. The non-transitory computer-program product of claim 12, wherein the criteria generates a codebook that forms a basis for implementation of the clustering algorithm.

14. The non-transitory computer-program product of claim 10, wherein the user can perform drag and drop operations on the one or more groups of customer comments using the graphical user interface.

15. A system for categorizing codes based on sentiment, comprising:

a processor;

memory coupled with the processor;

instructions stored in the memory and executable by the processor to cause the system to:

receive a text input comprising a plurality of customer comments and customer reviews of products and services;

partition the text input into one or more segments, each segment associated with a semantic meaning;

generate one or more numerical vectors associated with each of the one or more segments, wherein each numerical vector represents a relationship between the associated segments and the one or more segments;

compare the one or more numerical vectors to generate, using a pre-trained machine learning model, a plurality of cosine proximity values associated with the one or more numerical vectors, wherein the machine learning model is pre-trained based on previous customer reviews and review sentiments;

apply a clustering algorithm to the one or more numerical vectors to generate one or more clusters of segments within one or more cosine proximity ranges, wherein each of the one or more clusters of segments corresponds with a sentiment;

generate, using the pre-trained machine learning model, one or more codes associated with each of the clusters of segments within the one or more cosine proximity ranges, wherein each code is a category related to one or more of the customer comments and customer reviews;

display the one or more codes to a user on a graphical user interface;

determine a confidence level for each of the one or more of the customer comments and customer reviews of a selected code based on the plurality of cosine proximity values associated with the segments in the one or more of the customer comments and customer reviews; and display the one or more of the customer reviews associated with the selected code in sorted order according to the confidence levels of the one or more of the customer comments and customer reviews.

16. The system of claim 15, wherein the cosine proximity values indicate a level of semantic proximity between segments.

17. The system of claim 15, wherein partitioning the text input uses Natural Language Processing, Artificial Intelligence, or a Large Language Model.

18. The system of claim 15, wherein the one or more numerical vectors are generated using a Bidirectional Encoder Representations from Transformers algorithm comprising a machine-learning framework.

19. The system of claim 15, wherein the user can perform drag and drop operations on the one or more codes using the graphical user interface.

20. The method of claim 1, wherein the graphic user interface comprises a plurality of filtering checkboxes, each filtering checkbox is associated with a confidence level range, the method further comprises:

determining whether one or more of the filtering checkboxes are selected;

in determining that the one or more of the filtering checkboxes are selected, determining whether a confidence level of at least one customer review associated with the selected code is out of a combining confidence level range of the one or more of the filtering checkboxes; and in determining that the confidence level of the at least one customer review associated with the selected code is out of a combining confidence level range of the one or more of the filtering checkboxes, excluding the at least one customer review from displaying on the graphic user interface.

* * * * *